(12) United States Patent
Doan et al.

(10) Patent No.: US 12,243,309 B2
(45) Date of Patent: Mar. 4, 2025

(54) REPEATABILITY PREDICTIONS OF INTEREST POINTS

(71) Applicant: Niantic, Inc., San Francisco, CA (US)

(72) Inventors: Dung Anh Doan, Prospect (AU); Daniyar Turmukhambetov, London (GB); Soohyun Bae, Los Gatos, CA (US)

(73) Assignee: Niantic, Inc., San Francisco, CA (US)

( * ) Notice: Subject to any disclaimer, the term of this patent is extended or adjusted under 35 U.S.C. 154(b) by 377 days.

(21) Appl. No.: 17/730,555

(22) Filed: Apr. 27, 2022

(65) Prior Publication Data

US 2022/0351518 A1    Nov. 3, 2022

Related U.S. Application Data

(60) Provisional application No. 63/182,648, filed on Apr. 30, 2021.

(51) Int. Cl.
*G06V 20/50* (2022.01)
*G06T 7/73* (2017.01)
(Continued)

(52) U.S. Cl.
CPC ............... *G06V 20/50* (2022.01); *G06T 7/74* (2017.01); *G06V 10/774* (2022.01); *G06V 20/90* (2022.01);
(Continued)

(58) Field of Classification Search
CPC ...... G06V 20/50; G06V 10/774; G06V 20/90; G06V 10/768; G06V 20/20; G06T 7/74;
(Continued)

(56) References Cited

U.S. PATENT DOCUMENTS

2012/0249802 A1    10/2012  Taylor
2012/0301014 A1*   11/2012  Xiao .................... G06V 10/464
                                                              382/159
(Continued)

FOREIGN PATENT DOCUMENTS

CN        102681661 B    5/2015
CN        111476911 A    7/2020

OTHER PUBLICATIONS

Christiansen, P., et al. "Unsuperpoint: End-To-End Unsupervised Interest Point Detector and Descriptor," Arxiv Preprint, Jul. 10, 2019, pp. 1-14.
(Continued)

*Primary Examiner* — Molly Wilburn
(74) *Attorney, Agent, or Firm* — Fenwick & West LLP

(57) ABSTRACT

The present disclosure describes approaches for evaluating interest points for localization uses based on a repeatability of the detection of the interest point in images capturing a scene that includes the interest point. The repeatability of interest points is determined by using a trained repeatability model. The repeatability model is trained by analyzing a time series of images of a scene and determining repeatability functions for each interest point in the scene. The repeatability function is determined by identifying which images in the time series of images allowed for the detection of the interest point by an interest point detection model.

20 Claims, 9 Drawing Sheets

(51) Int. Cl.
*G06V 10/774* (2022.01)
*G06V 20/90* (2022.01)

(52) U.S. Cl.
CPC .............. *G06T 2207/10016* (2013.01); *G06T 2207/20081* (2013.01); *G06T 2207/30244* (2013.01)

(58) Field of Classification Search
CPC . G06T 2207/10016; G06T 2207/20081; G06T 2207/30244; G06T 2207/30232; G06T 7/11; G06T 7/174; G06T 7/194; G06T 7/73
See application file for complete search history.

(56) References Cited

U.S. PATENT DOCUMENTS

| | | |
|---|---|---|
| 2016/0350904 A1* | 12/2016 | Zhang ..................... G06T 7/85 |
| 2019/0347485 A1 | 11/2019 | Yang et al. |
| 2020/0364509 A1 | 11/2020 | Weinzaepfel et al. |
| 2020/0364876 A1 | 11/2020 | Mohan et al. |

OTHER PUBLICATIONS

Tsao, C., et al. "How is the Augmented Reality Possible in Pokemon GO? An Interpretative Approach of the Phenomenology of Technology," The Journal of Information Society, Jul. 2020, pp. 71-79.
Taiwan Intellectual Property Office, Office Action, TW Application No. 111116103, Sep. 21, 2023, 26 pages.
PCT International Search Report and Written Opinion, U.S. PCT Application No. PCT/US2022/026471, Aug. 18, 2022, 8 pages.

\* cited by examiner

REPEATABILITY PREDICTIONS OF INTEREST POINTS

CROSS REFERENCE TO RELATED APPLICATIONS

This application claims the benefit of U.S. Provisional Application No. 63/182,648, filed Apr. 30, 2021, which is incorporated by reference in its entirety.

BACKGROUND

1. Technical Field

The subject matter described relates generally to camera localization, and in particular, to determining repeatability of interest point to evaluate an interest point's usability in camera localization applications.

2. Problem

Camera localization generally refers to a process for determining the location and orientation (pose) of a camera within an environment using images captured by the camera. Camera localization has a wide and increasing array of uses. In augmented reality (AR) applications, a virtual environment is co-located with a real-world environment. If the pose of a camera capturing images of the real-world environment (e.g., a video feed) is accurately determined, virtual elements can be overlaid on the depiction of the real-world environment with precision. For example, a virtual hat may be placed on top of a real statue, a virtual character may be depicted partially behind a physical object, and the like.

Camera localization may be performed by identifying interest points within an image captured by the camera and mapping the interest point to a 3-dimensional (3D) map. However, due to ever changing conditions in the real world, interest points may disappear from a scene from time to time. For example, an interest point may disappear from time to time due to moving vehicles passing in front of the interest point. In another example, lighting condition may cause a model for detecting interest points to miss the identification of an interest point within the image of a scene. As such, there is a need to be able to determine how stable an interest point would be to be able to determine whether the interest point is a suitable candidate for localization purposes.

SUMMARY

The present disclosure describes approaches for evaluating interest points for localization uses based on a repeatability of the detection of the interest point in images capturing a scene that includes the interest point. The repeatability of interest points is determined by using a trained repeatability model. The repeatability model is trained by analyzing a time series of images of a scene and determining repeatability functions for each interest point in the scene. The repeatability function is determined by identifying which images in the time series of images allowed for the detection of the interest point by an interest point detection model.

The repeatability model may be used for generating a summary map by filtering out interest points that are unlikely to be detected during a current time. Moreover, the repeatability model may be used for identifying interest points within an input image to query a 3D map for receiving information to perform a localization algorithm for determining a pose of a camera that captured the input image.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world. In addition, the inherent flexibility of computer-based systems allows for a great variety of possible configurations, combinations, and divisions of tasks and functionality between and among the components of the system.

Example Location-Based Parallel Reality Game

Figure 1:
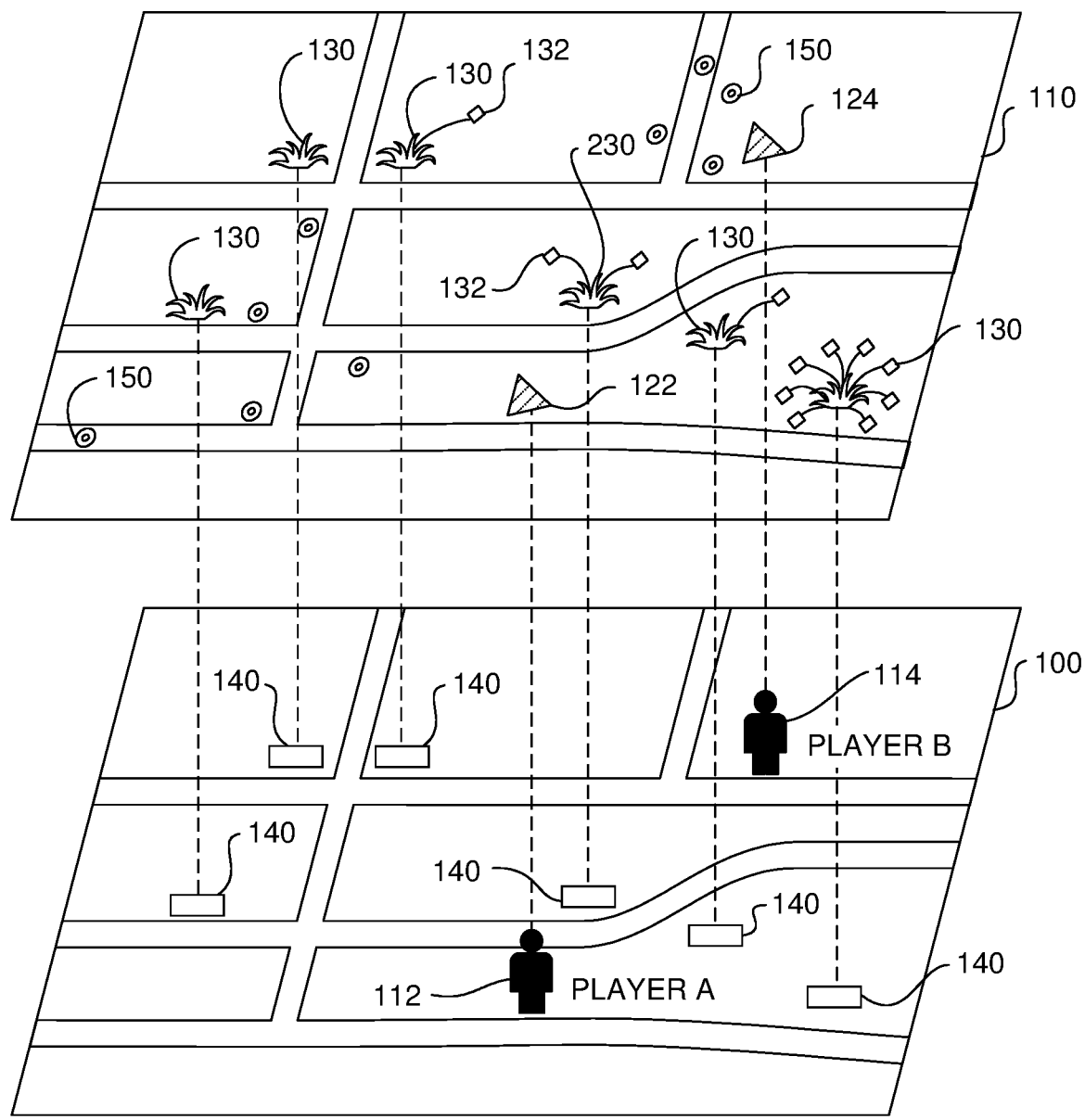
FIG. 1 depicts a representation of a virtual world having a geography that parallels the real world, according to one embodiment.

FIG. 1 is a conceptual diagram of a virtual world 110 that parallels the real world 100. The virtual world 110 can act as the game board for players of a parallel reality game. As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110. The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system, a localization system, or both) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include game objectives requiring players to travel to or interact with various virtual elements or virtual objects scattered at various virtual locations in the virtual world 110. A player can travel to these virtual locations by traveling to the corresponding location of the virtual elements or objects in the real world 100. For instance, a positioning system can track the position of the player such that as the player navigates the real world 100, the player also navigates the parallel virtual world 110. The player can then interact with various virtual elements and objects at the specific location to achieve or perform one or more game objectives.

A game objective may have players interacting with virtual elements 130 located at various virtual locations in the virtual world 110. These virtual elements 130 can be linked to landmarks, geographic locations, or objects 140 in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives may require that players use one or more virtual items that are collected by the players in the location-based game. For instance, the players may travel the virtual world 110 seeking virtual items 132 (e.g. weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may have to gather virtual energy as part of the parallel reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing their locations.

Figure 2:
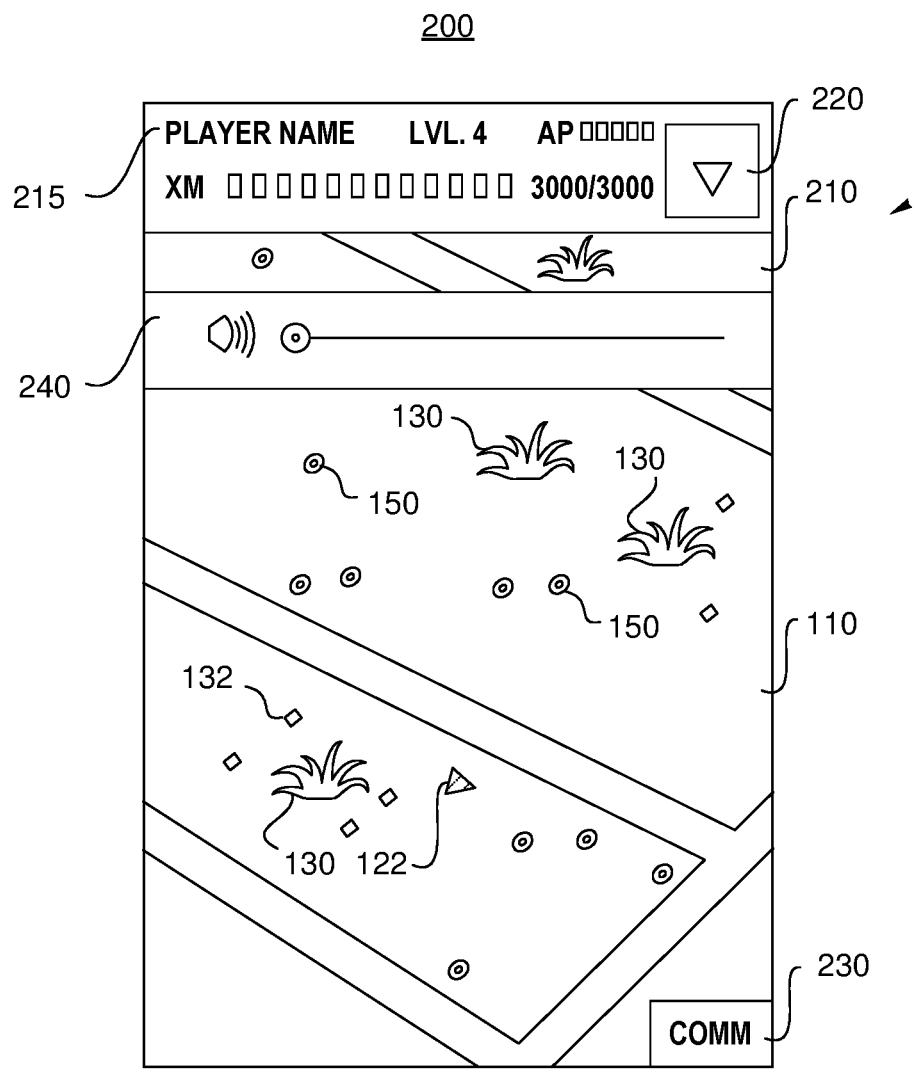
FIG. 2 depicts an exemplary game interface of a parallel reality game, according to one embodiment.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel reality game.

According to aspects of the present disclosure, a player can interact with the parallel reality game by carrying a client device 310 around in the real world. For instance, a player can play the game by accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a user to interact with the game. For instance, the game interface can provide audible notifications to the player when the player is approaching a virtual element or object in the game or when an important event happens in the parallel reality game. In some embodiments, a player can control these audible notifications with audio control 240. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

In some embodiments, the virtual world is shared among multiple players at the same time. That is, virtual objects placed in the virtual world appear at the same (or substantially the same) location for all users interacting in the same virtual world. Moreover, users interacting with virtual objects affect the gameplay of other users that are interacting in the same virtual world. For example, if a first player moves a virtual object from a first location to a second, the other players interacting in the same virtual world will experience the object moving from the first location to the second location.

In a parallel world setting, where locations in the virtual world correspond to locations in the real world, the locations of virtual items in the virtual world corresponds to locations in the real world. When an augmented reality application is used to interact with the virtual world, knowing the location of the camera used for generating the augmented reality content is beneficial. Moreover, since the multiple users may be able to see and interact with the same virtual object via their respective augment reality interface, knowing the actual pose of the camera used for generating the virtual reality content is also beneficial. That is, by knowing the location and pose of the camera used for generating the augmented reality content, the positioning and orientation of the virtual content within the augmented reality interface presented to the player can be improved, resulting in a more accurate experience when multiple players concurrently interact with the same object in the virtual world.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

Exemplary Location-Based Parallel Reality Gaming System

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where determining the repeatability of an interest point within an image is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 3:
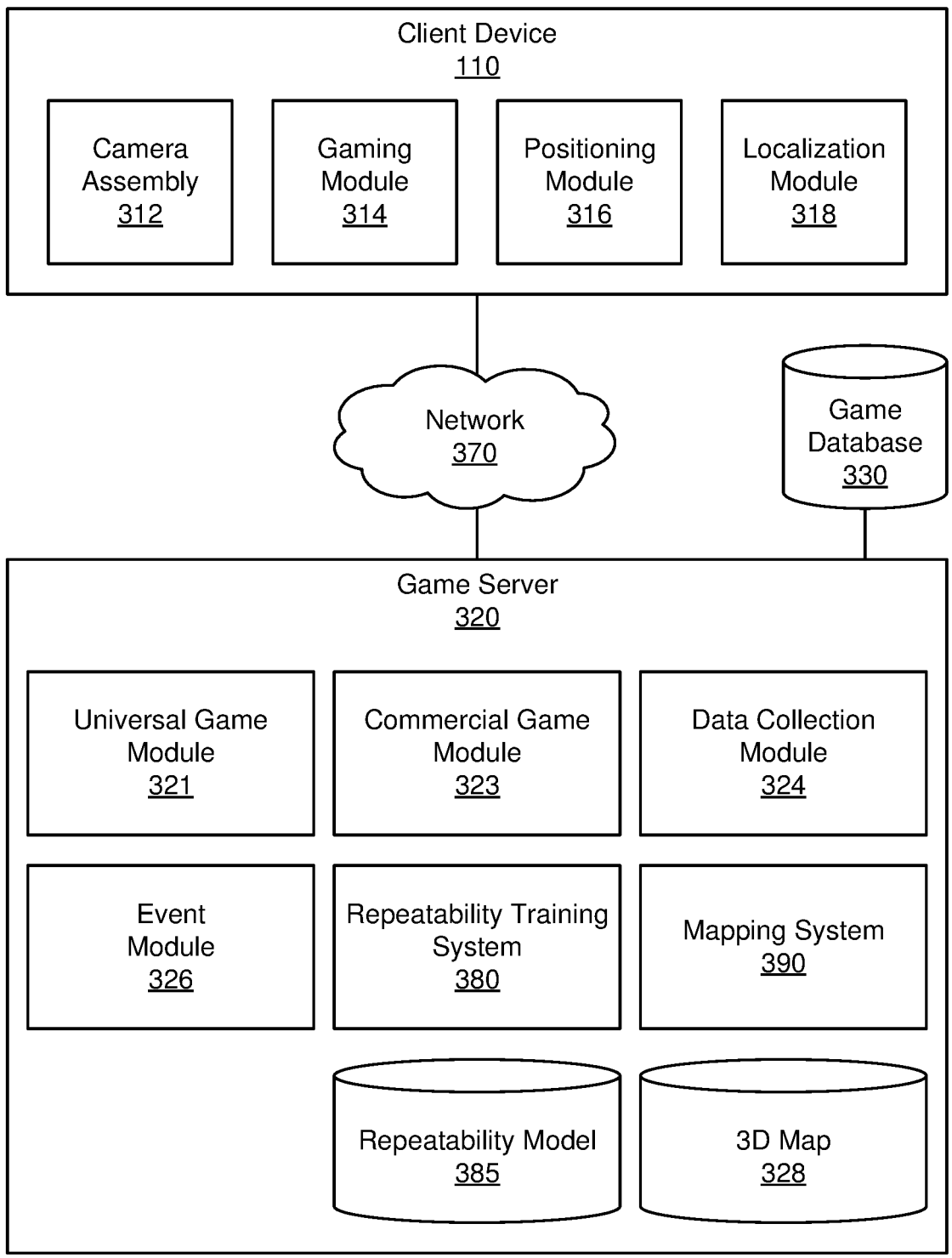
FIG. 3 illustrates a networked computing environment, in accordance with one or more embodiments.

FIG. 3 illustrates one embodiment of a networked computing environment 300. The networked computing environment 300 uses a client-server architecture, where a game server 320 communicates with a client device 310 over a network 370 to provide a parallel reality game to a player at the client device 310. The networked computing environment 300 also may include other external systems such as sponsor/advertiser systems or business systems. Although only one client device 310 is shown in FIG. 3, any number of client devices 310 or other external systems may be connected to the game server 320 over the network 370. Furthermore, the networked computing environment 300 may contain different or additional elements and functionality may be distributed between the client device 310 and the server 320 in different manners than described below.

The networked computing environment 300 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 310 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 310.

The networked computing environment 300 uses a client-server architecture, where a game server 320 communicates with a client device 310 over a network 370 to provide a parallel reality game to players at the client device 310. The networked computing environment 300 also may include other external systems such as sponsor/advertiser systems or business systems. Although only one client device 310 is illustrated in FIG. 3, any number of clients 310 or other external systems may be connected to the game server 320 over the network 370. Furthermore, the networked computing environment 300 may contain different or additional elements and functionality may be distributed between the client device 310 and the server 320 in a different manner than described below.

A client device 310 can be any portable computing device capable for use by a player to interface with the game server 320. For instance, a client device 310 is preferably a portable wireless device that can be carried by a player, such as a smartphone, portable gaming device, augmented reality (AR) headset, cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the game server 320 providing the game server 320 with sensory data of a physical environment. The client device 310 includes a camera assembly 312 that captures image data in two dimensions of a scene in the physical environment where the client device 310 is. In the embodiment shown in FIG. 3, each client device 310 includes software components such as a gaming module 314 and a positioning module 316. The client device 310 also includes a localization module 318. The client device 310 may include various other input/output devices for receiving information from and/or providing information to a player. Example input/output devices include a display screen, a touch screen, a touch pad, data entry keys, speakers, and a microphone suitable for voice recognition. The client device 310 may also include other various sensors for recording data from the client device 310 including but not limited to movement sensors, accelerometers, gyroscopes, other inertial measurement units (IMUs), barometers, positioning systems, thermometers, light sensors, etc. The client device 310 can further include a network interface for providing communications over the network 370. A network interface can include any suitable components for interfacing with one more networks, including for example, transmitters, receivers, ports, controllers, antennas, or other suitable components.

The camera assembly 312 includes one or more cameras which can capture image data. The cameras capture image data describing a scene of the environment surrounding the client device 310 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video.

Additionally, the orientation of the camera assembly 312 could be parallel to the ground with the camera assembly 312 aimed at the horizon. The camera assembly 312 captures image data and shares the image data with the computing device on the client device 310. The image data can be appended with metadata describing other details of the image data including sensory data (e.g. temperature, brightness of environment) or capture data (e.g. exposure, warmth, shutter speed, focal length, capture time, etc.). The camera assembly 312 can include one or more cameras which can capture image data. In one instance, the camera assembly 312 comprises one camera and is configured to capture monocular image data. In another instance, the camera assembly 312 comprises two cameras and is configured to capture stereoscopic image data. In various other implementations, the camera assembly 312 comprises a plurality of cameras each configured to capture image data.

The client device 310 may also include additional sensors for collecting data regarding the environment surrounding the client device, such as movement sensors, accelerometers, gyroscopes, barometers, thermometers, light sensors, microphones, etc. The image data captured by the camera assembly 312 can be appended with metadata describing other information about the image data, such as additional sensory data (e.g. temperature, brightness of environment, air pressure, location, pose etc.) or capture data (e.g. exposure length, shutter speed, focal length, capture time, etc.).

The gaming module 314 provides a player with an interface to participate in the parallel reality game. The game server 320 transmits game data over the network 370 to the client device 310 for use by the gaming module 314 at the client device 310 to provide local versions of the game to players at locations remote from the game server 320. The game server 320 can include a network interface for providing communications over the network 370. A network interface can include any suitable components for interfacing with one more networks, including for example, transmitters, receivers, ports, controllers, antennas, or other suitable components.

The gaming module 314 provides a player with an interface to participate in the parallel reality game. The game server 320 transmits game data over the network 370 to the client device 310 for use by the gaming module 314 to provide a local version of the game to a player at locations remote from the game server. In one embodiment, the gaming module 314 presents a user interface on a display of the client device 310 that depicts a virtual world (e.g., renders imagery of the virtual world) and allows a user to interact with the virtual world to perform various game objectives. In some embodiments, the gaming module 314 presents images of the real world (e.g., captured by the camera assembly 312) augmented with virtual elements from the parallel reality game. In these embodiments, the gaming module 314 may generate or adjust virtual content according to other information received from other components of the client device 310. For example, the gaming module 314 may adjust a virtual object to be displayed on the user interface according to a depth map of the scene captured in the image data.

The gaming module 314 can also control various other outputs to allow a player to interact with the game without requiring the player to view a display screen. For instance, the gaming module 314 can control various audio, vibratory, or other notifications that allow the player to play the game without looking at the display screen. The gaming module 314 can access game data received from the game server 320 to provide an accurate representation of the game to the user. The gaming module 314 can receive and process player input and provide updates to the game server 320 over the network 370. The gaming module 314 may also generate and/or adjust game content to be displayed by the client device 310. For example, the gaming module 314 may generate a virtual element based on depth information.

The positioning module 316 can be any device or circuitry for determining the position of the client device 310. For example, the positioning module 316 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 310 in the real world, the positioning module 316 tracks the position of the player and provides the player position information to the gaming module 314. The gaming module 314 updates the player position in the virtual world associated with the game based on the actual position of the player in the real world. Thus, a player can interact with the virtual world simply by carrying or transporting the client device 310 in the real world. In particular, the location of the player in the virtual world can correspond to the location of the player in the real world. The gaming module 314 can provide player position information to the game server 320 over the network 370. In response, the game server 320 may enact various techniques to verify the location of the client device 310 to prevent cheaters from spoofing their locations. It should be understood that location information associated with a player is utilized only if permission is granted after the player has been notified that location information of the player is to be accessed and how the location information is to be utilized in the context of the game (e.g. to update player position in the virtual world). In addition, any location information associated with players is stored and maintained in a manner to protect player privacy.

The localization module 318 receives the location determined for the client device 310 by the positioning module 316 and refines it by determining a pose of one or more cameras of the camera assembly 312. In one embodiment, the localization module 318 uses the location generated by the positioning module 316 to select a 3D map of the environment surrounding the client device 310. The localization module 318 may obtain the 3D map from local storage or from the game server 320. The 3D map may be a point cloud, mesh, or any other suitable 3D representation of the environment surrounding the client device 310.

In one embodiment, the localization module 318 applies a trained model to determine the pose of images captured by the camera assembly 312 relative to the 3D map. Thus, the localization model can determine an accurate (e.g., to within a few centimeters and degrees) determination of the position and orientation of the client device 310. The position of the client device 310 can then be tracked over time using dead reckoning based on sensor readings, periodic re-localization, or a combination of both. Having an accurate pose for the client device 310 may enable the game module 314 to present virtual content overlaid on images of the real world (e.g., by displaying virtual elements in conjunction with a real-time feed from the camera assembly 312 on a display) or the real world itself (e.g., by displaying virtual elements on a transparent display of an AR headset) in a manner that gives the impression that the virtual objects are interacting with the real world. For example, a virtual character may hide behind a real tree, a virtual hat may be placed on a real statue, or a virtual creature may run and hide if a real person approaches it too quickly.

In some embodiments, the model used by the localization module 318 is trained to determine the relative pose of a camera from one or more images captured by that camera relative to one or more existing images of the physical environment around the client device 310. In one embodiment, the localization module 318 may convert the relative pose into an absolute pose with reference to known absolute poses of one or more of the existing images. For example, the game database 315 may store a set of reference images of the physical environment captured by cameras with different poses. The absolute pose for each reference image may be stored in association with the reference images (e.g., as metadata). Thus, once the pose of the camera of the client device 310 has been determined relative to one or more of the reference images, the absolute pose of the camera of the client device may be determined using the absolute pose of the reference images and the relative pose of the camera.

The game server 320 includes one or more computing devices that provide game functionality to the client device 310. The game server 320 can include or be in communication with a game database 330. The game database 330 stores game data used in the parallel reality game to be served or provided to the client device 310 over the network 370.

The game data stored in the game database 330 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); or (8) any other data used, related to, or obtained during implementation of the parallel reality game. The game data stored in the game database 330 can be populated either offline or in real time by system administrators or by data received from users (e.g., players) of the system, such as from a client device 310 over the network 370.

The game server 320 can be configured to receive requests for game data from a client device 310 (for instance via remote procedure calls (RPCs)) and to respond to those requests via the network 370. For instance, the game server 320 can encode game data in one or more data files and provide the data files to the client device 310. In addition, the game server 320 can be configured to receive game data (e.g., player positions, player actions, player input, etc.) from a client device 310 via the network 370. For instance, the client device 310 can be configured to periodically send player input and other updates to the game server 320, which the game server 320 uses to update game data in the game database 315 to reflect any and all changed conditions for the game.

In the embodiment shown in FIG. 3, the game server 320 includes a universal gaming module 322, a commercial game module 323, a data collection module 324, an event module 326, a repeatability training system 380, the repeatability model 385, a mapping system 327, and a 3D map 328. As mentioned above, the game server 320 interacts with a game database 315 that may be part of the game server 320 or accessed remotely (e.g., the game database 315 may be a distributed database accessed via the network 370). In other embodiments, the game server 320 contains different and/or additional elements. In addition, the functions may be distributed among the elements in a different manner than described. For instance, the game database 315 can be integrated into the game server 320.

The universal game module 322 hosts an instance of the parallel reality game for a set of players (e.g., all players of the parallel reality game) and acts as the authoritative source for the current status of the parallel reality game for the set of players. As the host, the universal game module 322 generates game content for presentation to players (e.g., via their respective client devices 310). The universal game module 322 may access the game database 330 to retrieve or store game data when hosting the parallel reality game. The universal game module 322 may also receive game data from client devices 310 (e.g. depth information, player input, player position, player actions, landmark information, etc.) and incorporates the game data received into the overall parallel reality game for the entire set of players of the parallel reality game. The universal game module 322 can also manage the delivery of game data to the client device 310 over the network 370. In some embodiments, the universal game module 322 also governs security aspects of the interaction of the client device 310 with the parallel reality game, such as securing connections between the client device and the game server 320, establishing connections between various client devices, or verifying the location of the various client devices 310 to prevent players cheating by spoofing their location.

The commercial game module 323 can be separate from or a part of the universal game module 322. The commercial game module 323 can manage the inclusion of various game features within the parallel reality game that are linked with a commercial activity in the real world. For instance, the commercial game module 323 can receive requests from external systems such as sponsors/advertisers, businesses, or other entities over the network 370 to include game features linked with commercial activity in the real world. The commercial game module 323 can then arrange for the inclusion of these game features in the parallel reality game on confirming the linked commercial activity has occurred. For example, if a business pays the provider of the parallel reality game an agreed upon amount, a virtual object identifying the business may appear in the parallel reality game at a virtual location corresponding to a real-world location of the business (e.g., a store or restaurant).

The data collection module 324 can be separate from or a part of the universal game module 322. The data collection module 324 can manage the inclusion of various game features within the parallel reality game that are linked with a data collection activity in the real world. For instance, the data collection module 324 can modify game data stored in the game database 330 to include game features linked with data collection activity in the parallel reality game. The data collection module 324 can also analyze and data collected by players pursuant to the data collection activity and provide the data for access by various platforms.

The event module 326 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The repeatability training system 380 trains the repeatability model 385. The repeatability training system 380 receives image data for use in training of the repeatability model 385. Generally, the repeatability training system 380 inputs a time series of images into the repeatability model 385 to generate or predict a repeatability function for the interest points identified in the images. As used herein, an interest point is a 3D point on objects and surfaces within a geographic region with characteristics that allows the point to be robustly detected in its depictions (e.g., images or videos). Interest points may be depicted in images (or videos) and they might be identified within the image by identifying the portions of the image that depicts the interest point. The repeatability training system 380 may use a supervised training algorithm to train the repeatability model 385. The repeatability training system 380 may define a total loss threshold for the repeatability model which can be used to determine whether the repeatability model is sufficiently accurate in estimating a repeatability function.

Once the repeatability model 385 is trained, the repeatability model receives data about an interest point (e.g., image data depicting an interest point) and outputs a prediction of the repeatability of the interest point. As used herein, repeatability refers to a likelihood that the interest point will be detected within a picture capturing the same scene but under different conditions (e.g., different time/date, lighting conditions, angles, weather, etc.). In some embodiments, the prediction of repeatability is in the form of a repeatability function indicating a repeatability value for each time interval in a set time period.

The mapping system 327 generates a 3D map of a geographical region based on a set of images. The 3D map may be a point cloud, polygon mesh, or any other suitable representation of the 3D geometry of the geographical region. The 3D map may include semantic labels providing additional contextual information, such as identifying objects tables, chairs, clocks, lampposts, trees, etc.), materials (concrete, water, brick, grass, etc.), or game properties (e.g., traversable by characters, suitable for certain in-game actions, etc.). In one embodiment, the mapping system 327 stores the 3D map along with any semantic/contextual information in the 3D map store 328. The 3D map may be stored in the 3D map store 328 in conjunction with location information (e.g., GPS coordinates of the center of the 3D map, a ringfence defining the extent of the 3D map, or the like). Thus, the game server 320 can provide the 3D map to client devices 310 that provide location data indicating they are within or near the geographic area covered by the 3D map.

The mapping system 390 additionally identifies interest points within the images (e.g., identifies a region of the image depicting the interest point) and stores information regarding the interest points in the 3D map 328. In some embodiments, the mapping system 390 generates the 3D map by computing the position of interest points based on multiple images depicting the interest points from various angles.

The mapping system 390 additionally generates summarized maps 3D that include a subset of data contained in the full 3D map. The summarized map can be generated to allow transmission and storage of the map by client devices with limited bandwidth or storage capabilities (e.g., mobile devices). The summarized map includes information that is relevant to the client device during a specific time. In some embodiments, as the client device moves or as time passes, the mapping system 390 updates the summarized map to remove interest points that are no longer relevant (e.g., because the repeatability value of the interest points during a current time is below a threshold value) and to add new interest points that have become relevant.

The network 370 can be any type of communications network, such as a local area network (e.g. intranet), wide area network (e.g. Internet), or some combination thereof. The network can also include a direct connection between a client device 310 and the game server 320. In general, communication between the game server 320 and a client device 310 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example Methods

Figure 4A:
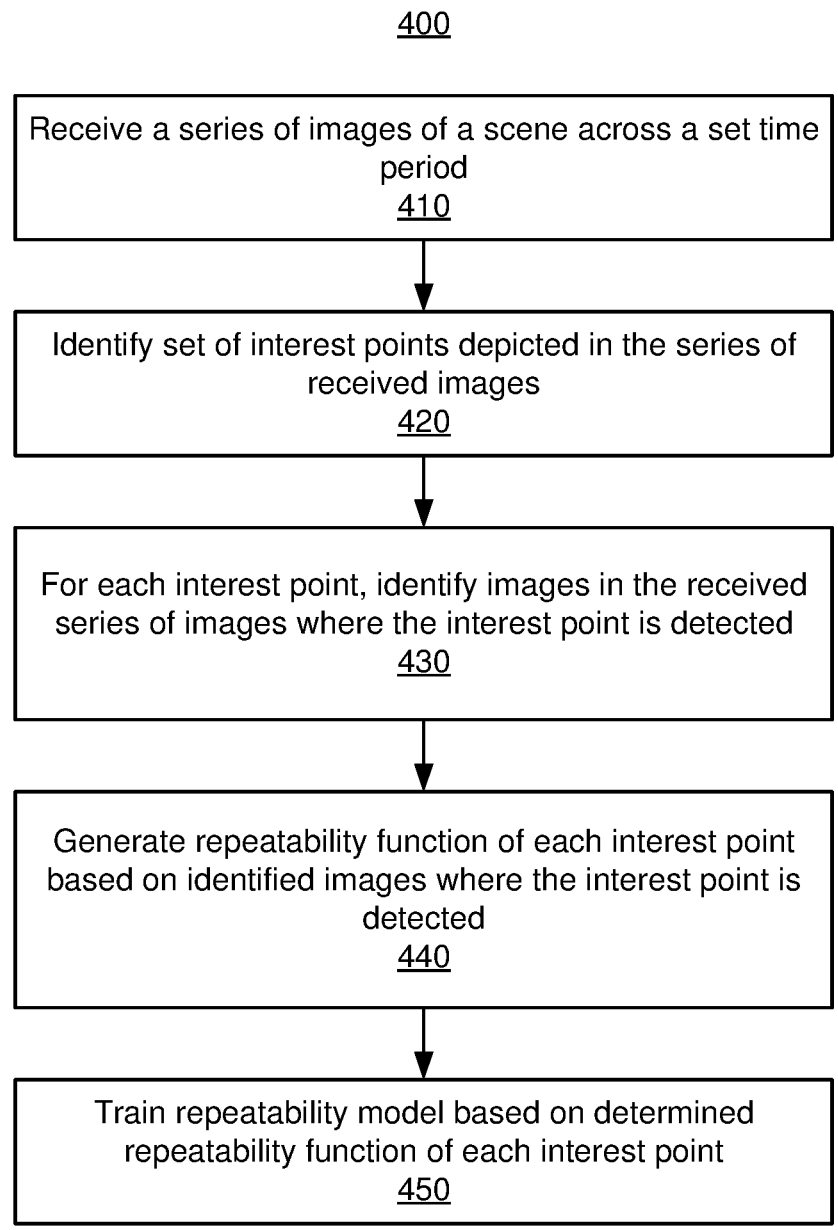
FIG. 4A is a flowchart describing a general process for training the repeatability model, in accordance with one or more embodiments.

FIG. 4A is a flowchart describing one iteration of a method 400 of training the repeatability model 385 with reference images, in accordance with one or more embodiments. At training time, the method 400 will typically be repeated numerous times with different input images until one or more training targets are met. The method 400 yields a trained repeatability model 385 that can determine a repeatability of an interest point depicted within an input image. The steps of FIG. 4A are illustrated from the perspective of the repeatability training system 380 performing the method 400. However, some or all of the steps may be performed by other entities and/or components. In addition, some embodiments may perform the steps in parallel, perform the steps in different orders, or perform different steps.

In the embodiment shown, the method 400 begins with the repeatability training system 380 receiving 410 a series of training images (e.g., a series of RGB image captured by a camera of a client device 310). In some embodiments, the series of training images are captured across a set time period (e.g., a day, a week, a month, or a year). Moreover, each image in the series of training images is associated with a timestamp indicating when the image was captured. In some embodiments, the series of training images are extracted from one or more videos recorded across the set time period.

Figure 4B:
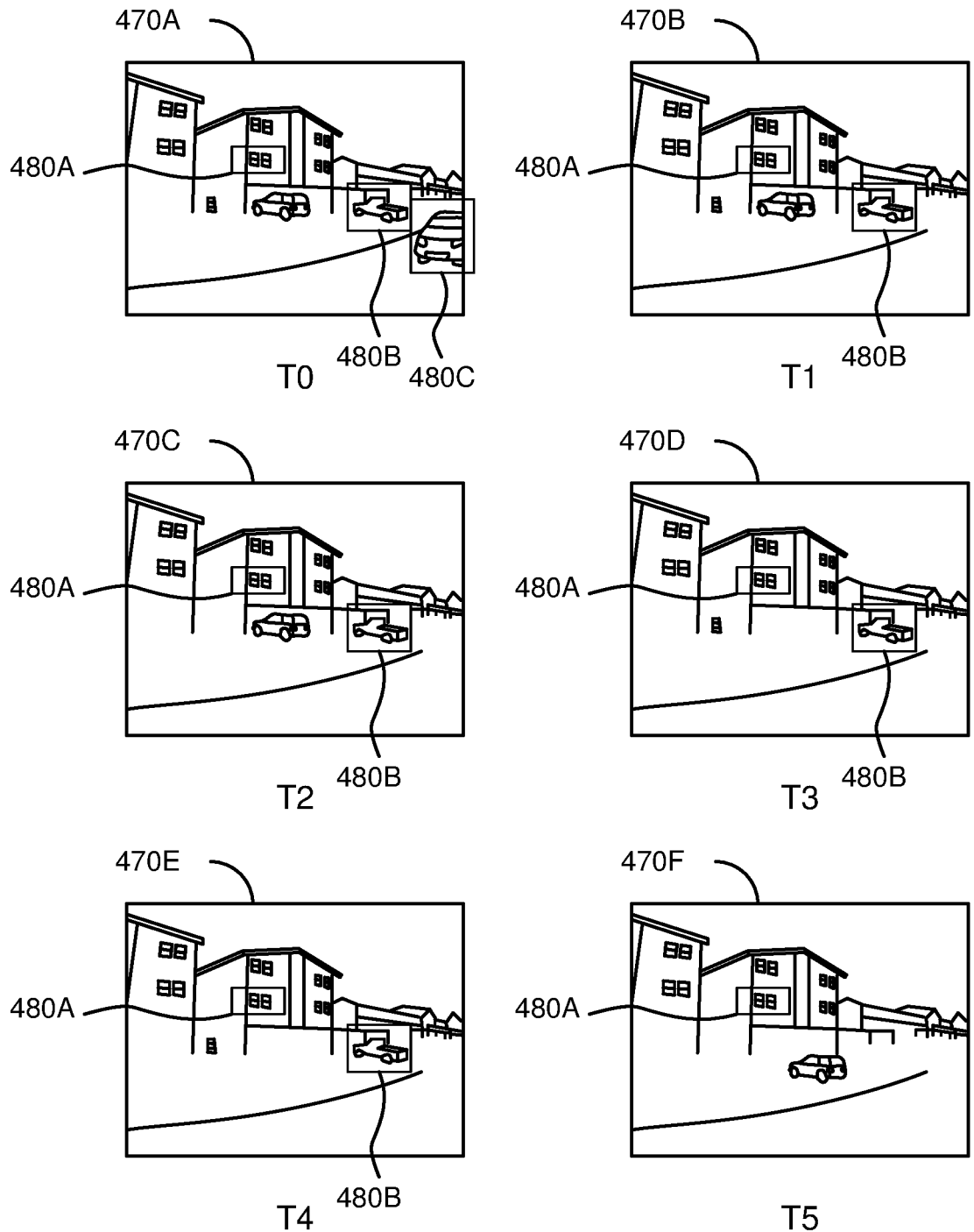
FIG. 4B illustrates a time series of images of a scene, according to one or more embodiments.

FIG. 4B illustrates a time series of training images of a scene, according to one or more embodiments. Specifically, FIG. 4B illustrates six images of the same scene taken a six different times (T0 through T5). In the example of FIG. 4B, the first image 470A is associated with a first timestamp T0, the second image 470B is associated with a second timestamp T1, the third image 470C is associated with a third timestamp T2, the fourth image 470D is associated with a fourth timestamp T3, the fifth image 470E is associated with a fifth timestamp T4, and the sixth image 470F is associated with a sixth timestamp T5.

The repeatability training system 380 identifies 420 a set of interest points depicted within the images in the received series of training images. In some embodiments, the repeatability training system 380 uses a trained model for detecting interest points within an input image (e.g., identifying portions of the input image depicting the interest points). In the example of FIG. 4B, the repeatability training system 380 identifies interest point 480A corresponding to windows of a building, interest point 480B corresponding to a pickup truck parked in front of a building, and interest point 480C corresponding to a car on the road.

For each interest point identified, the repeatability training system 380 identifies 430 the images within the series of training images where the interest point is detected. That is, for each image in the series of training images, the repeatability system 380 determines whether the trained model for detecting interest points detected a specific interest point. Based on this identification, the repeatability training system 380 generates 440 a repeatability function for interest point. In some embodiments, the repeatability function is further generated based on the timestamp associated with each of the images in the series of training images. For example, the repeatability function indicates whether the interest point was detected in an image within the set of training images during each time interval (e.g., each ten-minute period, each hour, morning/afternoon/evening/night, each day, each month, etc.) of the set time period associated with the series of training images. Alternatively, if each time interval is associated with multiple images (e.g., if multiple images are associated with a timestamp within the same time interval), the repeatability function may indicate a percentage of images associated with a specific time interval where the interest point was detected.

For example, in the embodiment of FIG. 4B, the repeatability training system 380 generates a repeatability function for the first interest point 480A, a repeatability function for the second interest point 480B, and a repeatability function for the third interest point 480C. The repeatability function for the first interest point 480A may specify that the first interest point 480A was detected in all six images 470A through 470F (across timestamps T0 through T5). The repeatability function for the second interest point 480B may specify that the second interest point was detected in the first five images 470A through 470E (across timestamps T0 through T4). Finally, the repeatability function for the third interest point 480C may specify that the third interest point was detected only in the first image 470A (at timestamp T0).

Using the generated repeatability function, the repeatability training system 380 trains a repeatability model 385 for estimating a repeatability function of a point of interest detected in an input image. In some embodiments, the repeatability model 385 is trained to determine a time series of likelihoods that an interest point will be detected in an image of a scene where the interest point is located. That is, for each time interval in a set time period, the repeatability model 385 is trained to predict the likelihood that the interest point will be detected in an image of the scene containing the interest point and captured by a camera within the specific time interval.

Figure 5:
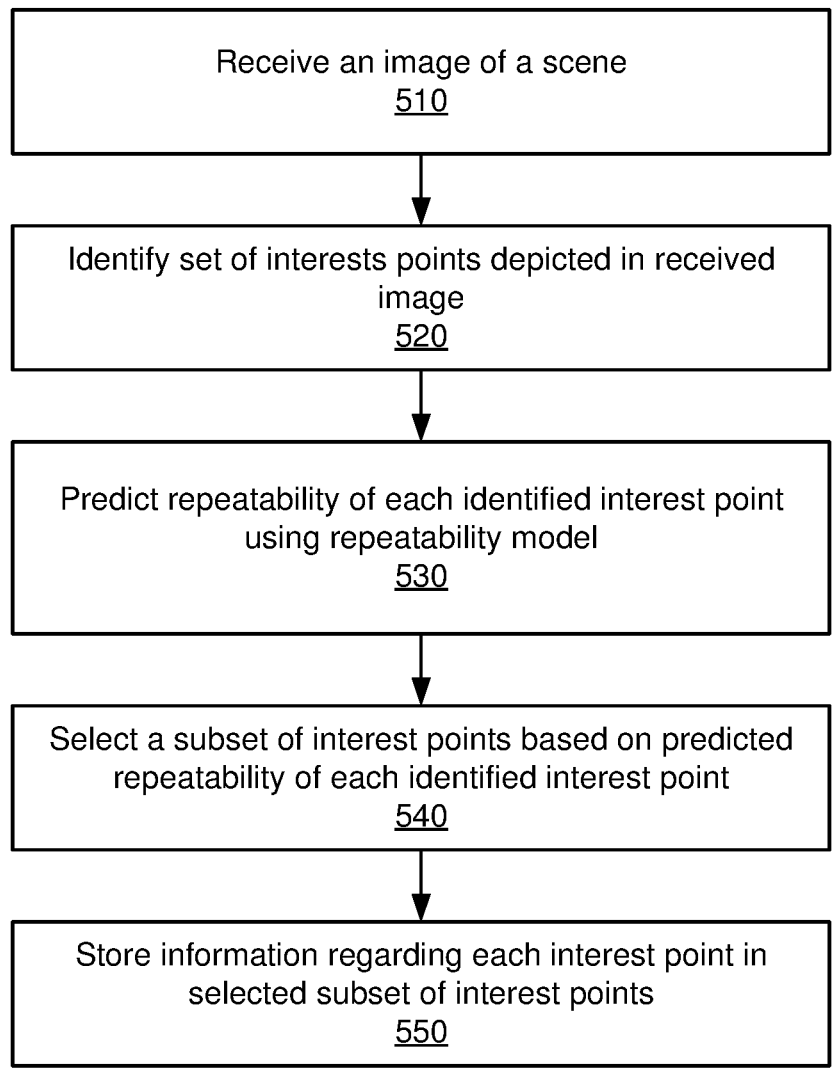
FIG. 5 is a flowchart describing an example use of the repeatability function to build a 3D map, according to one or more embodiments.

FIG. 5 is a flowchart describing a method 500 of using a repeatability model 385 for building a 3D map 328, in accordance with one or more embodiments. The method 500 results in a database of interest points that can be queried to gather information for determining a pose of a camera that took an input picture capturing a scene containing a depiction of a set of input interest points. The steps of FIG. 5 are illustrated from the perspective of the mapping system 390 performing the method 500. However, some or all of the steps may be performed by other entities and/or components. In addition, some embodiments may perform the steps in parallel, perform the steps in different orders, or perform different steps.

The mapping system 390 receives 510 an image of a scene. The mapping system 390 identifies 520 interest points depicted within the received image. In some embodiments, the mapping system 390 uses a trained model for detecting interest points within an input image (e.g., identifying portions of the input image depicting the interest points). For example, the mapping system 390 uses the same training model used by the repeatability training system 380 for identifying interest points depicted within an input image.

For each identified interest point, the mapping system 390 uses the repeatability model 385 trained by the repeatability training system 380 to predict 530 a repeatability of the interest point. For example, the repeatability model 385 is used to determine a repeatability function (or repeatability score) of the interest point. Based on the determined repeatability function, the mapping system 390 selects 540 a subset of interest points. For example, the mapping system 390 selects interest points with a repeatability function indicating an average repeatability above a certain threshold value. Alternatively, the mapping system 390 ranks the interest points based on their respective repeatability functions, and selects the top interest points based on the rankings. The mapping system 390 then stores 550 information regarding each of the interest points in the selected subset of interest points to build the 3D map 328. For example, the mapping system 390 stores images, coordinates, and other relevant information about each interest point in the selected subset of interest points.

Figure 6:
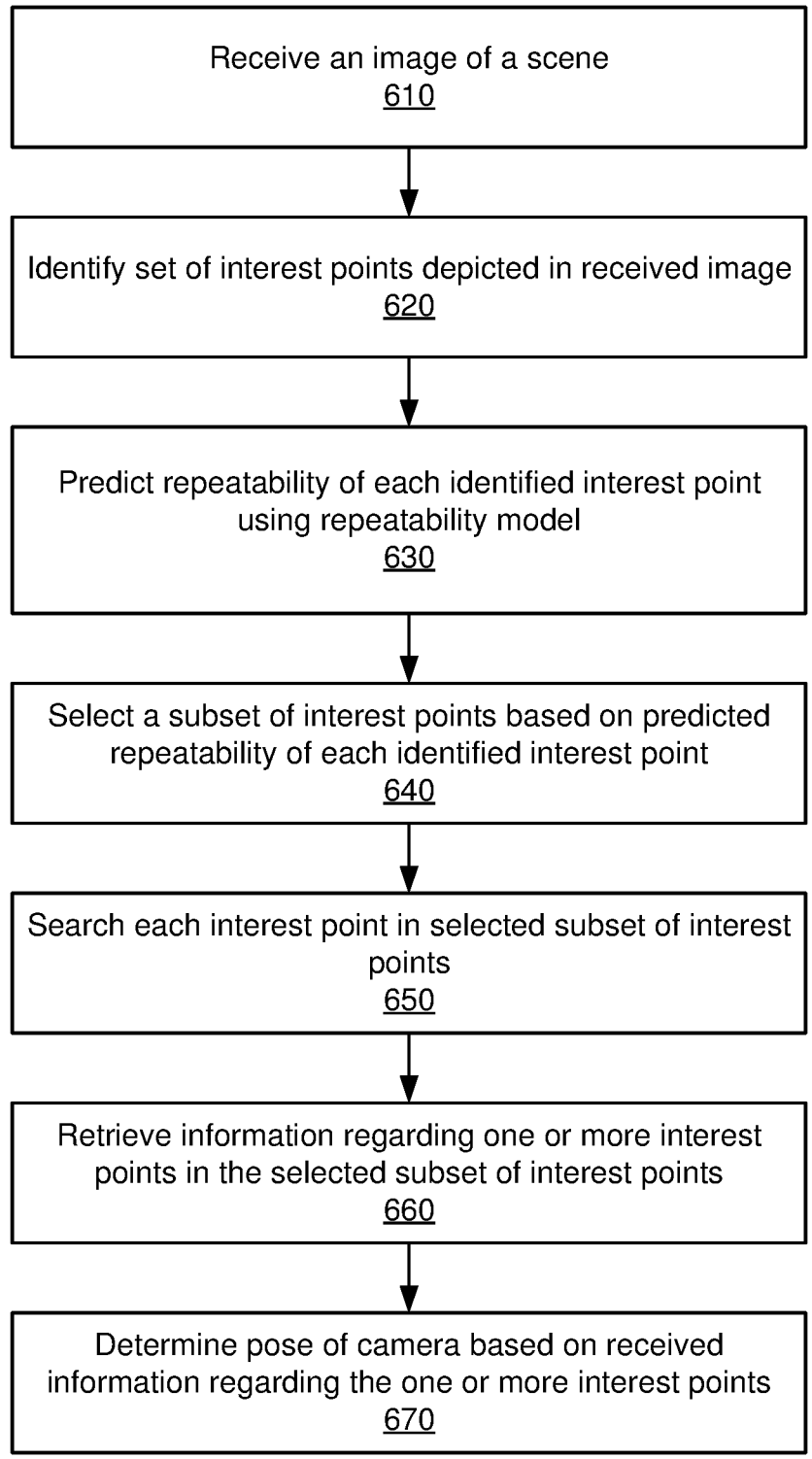
FIG. 6 is a flowchart describing an example use of the repeatability function to determine the pose of a camera, according to one or more embodiments.

FIG. 6 is a flowchart describing a method 600 of using a repeatability model 385 for determining the pose of a camera, in accordance with one or more embodiments. The method 600 results in an estimated pose for an input image. The steps of FIG. 6 are illustrated from the perspective of a client device 310 performing the method 600. However, some or all of the steps may be performed by other entities and/or components. In addition, some embodiments may perform the steps in parallel, perform the steps in different orders, or perform different steps.

The localization module of a client device 310 receives 610 an image of a scene. The image of the scene may be captured by a camera that is a component of the client device 310 or external to the client device 310. In the context of the parallel reality game, the scene may be of real-world locations that may map to virtual locations in the virtual world. The image of the scene may also have intrinsics corresponding to the geometric properties of the camera that captured the image. The image may be a single image captured by the camera. Alternatively, the image may be a frame from video being captured by the camera.

The localization module 318 identifies 620 a set of interest points depicted in the received image. In some embodiments, the localization module 318 uses a trained model for detecting interest points within an input image (e.g., identifying portions of the input image depicting the interest points). For example, the localization module 318 uses the same training model used by the repeatability training system 380 for identifying interest points depicted within an input image.

For each identified interest point, the localization module 318 applies the repeatability model 385 trained by the repeatability training system 380 to predict 630 a repeatability of the interest point. For example, the repeatability model 385 is used to determine a repeatability function (or repeatability score) of each identified interest point. Based on the determined repeatability function, the localization module 318 selects 640 a subset of interest points. For example, the localization module 318 selects interest points with a repeatability function indicating an average repeatability above a certain threshold value. Alternatively, the localization module 318 ranks the interest points based on their respective repeatability functions, and selects the top interest points based on the rankings. The localization module 318 then searches 650 the interest points within the 3D map 328 and retrieves 660 information regarding one or more interest points from the 3D map 328. Based on the retrieved information regarding one or more interest points, the localization module 318 determines 670 a pose of a camera that captured the received image.

Figure 7:
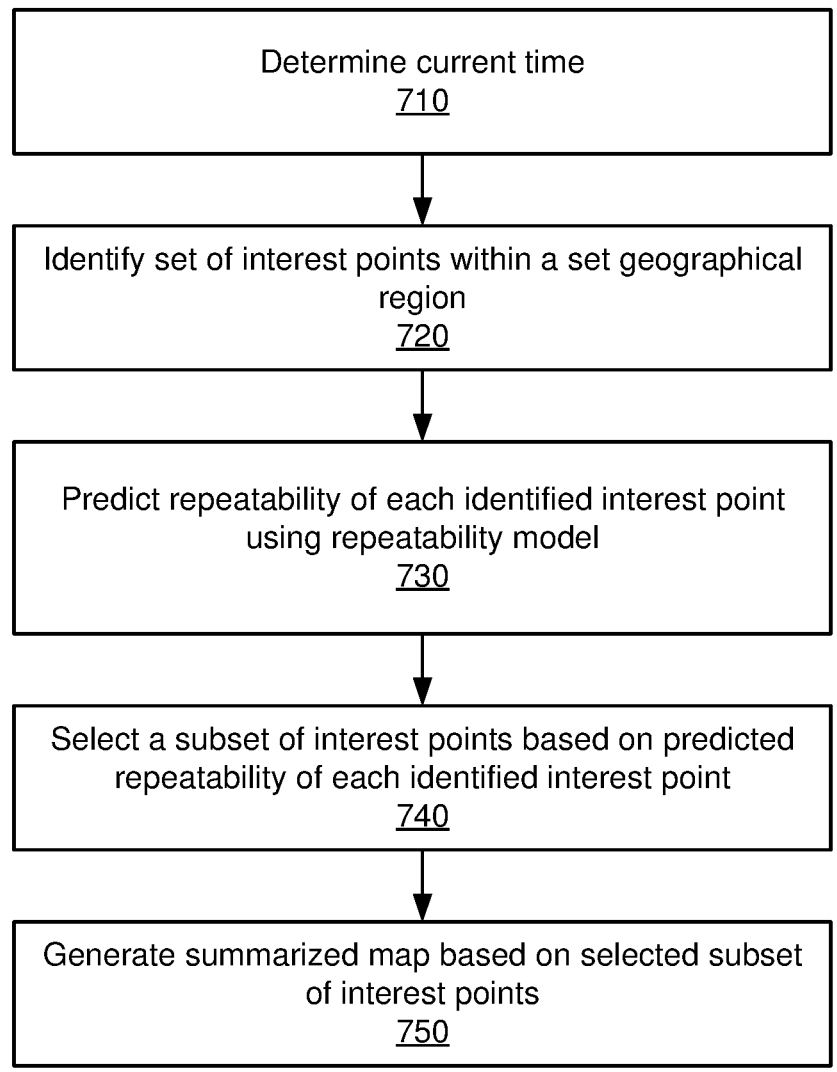
FIG. 7 is a flowchart describing an example use of the repeatability function to build a summarized map, according to one or more embodiments.

FIG. 7 is a flowchart describing a method 700 of using a repeatability model 385 for building a summarized map of a specific location, in accordance with one or more embodiments. The method 600 results in a summarized map that can be transmitted to a client device 310 to allow the client device to determine a pose of the client device within 3D space. The steps of FIG. 7 are illustrated from the perspective of the mapping system 390 performing the method 700. However, some or all of the steps may be performed by other entities and/or components. In addition, some embodiments may perform the steps in parallel, perform the steps in different orders, or perform different steps.

The mapping system 390 determines 710 a current time for a client device 310. The mapping system 390 may receive the current time from the client device, or may determine the current local time for the client device based on an internal time of the game server 320 and the location of the client device 310. In other embodiments, the mapping system 390 stores time values using a universal time (e.g., UTC). Thus, the current time for the client device 310 is the same as the local time for the mapping system 390. The mapping system 390 identifies 720 a set of interest points within a set geographical region. For example, the mapping system 390 identifies a set of interest points that are in the vicinity of the client device 310 (e.g., k-nearest interest points).

The mapping system 390 applies the repeatability model 385 to each of the identified interest points in the set of interest points to predict 730 a repeatability of interest points during the current time. For example, the repeatability model 385 is used to determine a repeatability value of each interest point during the current time. Based on the determined repeatability of each interest point, the mapping system 390 selects 740 a subset of interest points to be included in the summarized map. For example, the mapping system 390 selects interest points with a repeatability value for the current time above a certain threshold value. Alternatively, the mapping system 390 ranks the interest points based on their respective repeatability values, and selects the top interest points based on the rankings. The mapping system 390 then generates 750 a summarized map based on the selected subset of interest points. The summarized map may be used for determining the pose of the client device (e.g., using the method 600 of FIG. 6).

Example Computing System

Figure 8:
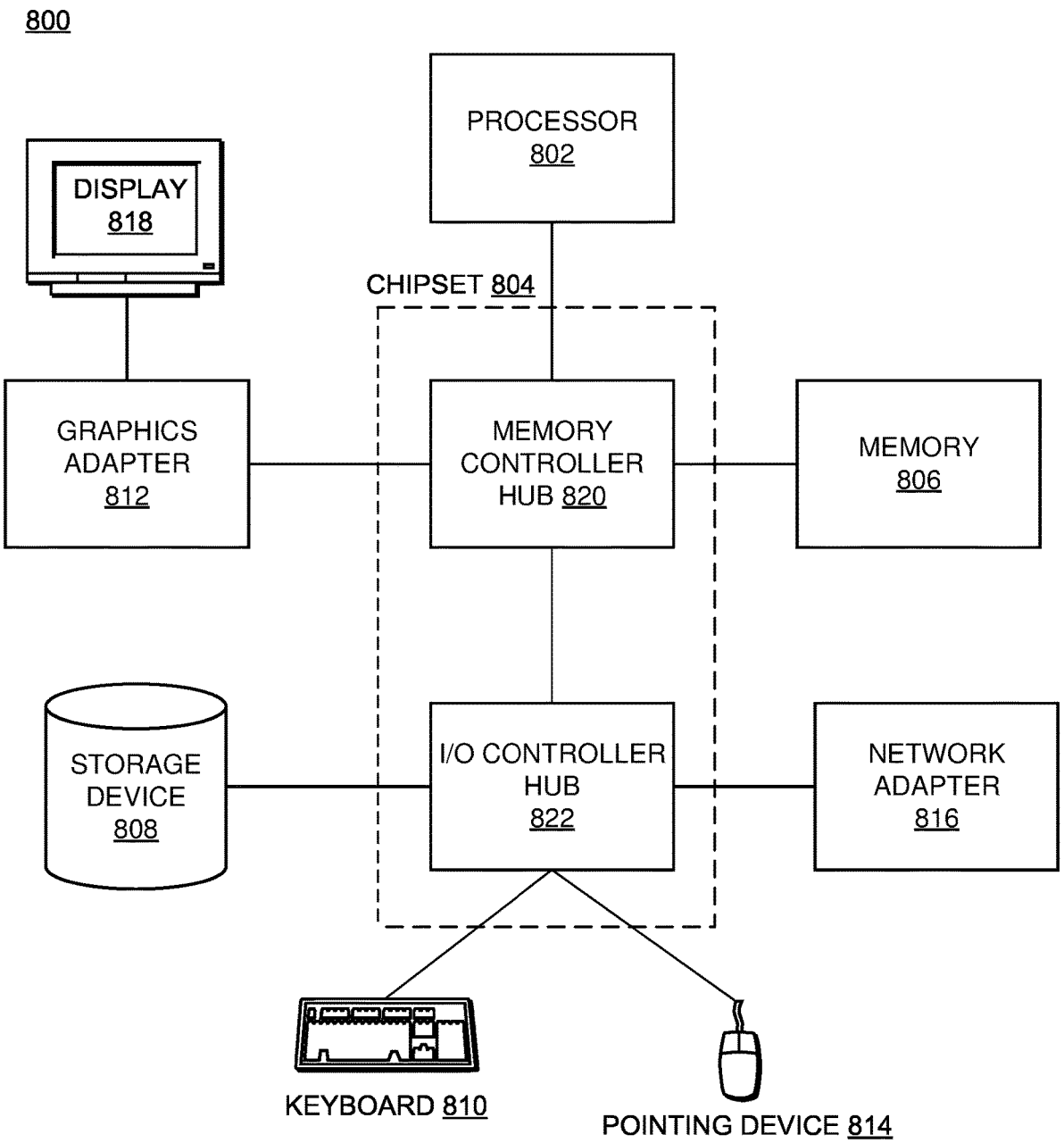
FIG. 8 illustrates an example computer system suitable for use in training or applying a repeatability model, according to one or more embodiments.

FIG. 8 is an example architecture of a computing device, according to an embodiment. Although FIG. 8 depicts a high-level block diagram illustrating physical components of a computer used as part or all of one or more entities described herein, in accordance with an embodiment, a computer may have additional, less, or variations of the components provided in FIG. 8. Although FIG. 8 depicts a computer 800, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 8 are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In some embodiments, the computer 800 includes one or more communication buses for interconnecting these components. The one or more communication buses optionally include circuitry (sometimes called a chipset) that interconnects and controls communications between system components.

The storage device 808 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 808 can also be referred to as persistent memory. The pointing device 814 may be a mouse, track ball, or other type of pointing device, and is used in combination with the keyboard 810 to input data into the computer 800. The graphics adapter 812 displays images and other information on the display 818. The network adapter 816 couples the computer 800 to a local or wide area network.

The memory 806 holds instructions and data used by the processor 802. The memory 806 can be non-persistent memory, examples of which include high-speed random-access memory, such as DRAM, SRAM, DDR RAM, ROM, EEPROM, flash memory.

As is known in the art, a computer 800 can have different and/or other components than those shown in FIG. 8. In addition, the computer 800 can lack certain illustrated components. In one embodiment, a computer 800 acting as a server may lack a keyboard 810, pointing device 814, graphics adapter 812, and/or display 818. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for determining or using the repeatability of interest points. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method, comprising:
   receiving an identification of a location of a client device;
   identifying a plurality of interest points located in the vicinity of the location of the client device;
   determining a repeatability score of each of the identified interest points;
   selecting a subset of interest points based on the determined repeatability score of each of the identified interest points;
   generate a summary map of a vicinity of the location of the client device based on the selected subset of interest points; and
   sending the summary map to the client device.

2. The method of claim 1, further comprising:
   storing, in a 3D map, information about each interest point in the selected subset of interest points.

3. The method of claim 1, wherein determining a repeatability score for an identified interest point, comprises:
   applying a repeatability model based on the identified interest point, the repeatability model trained based on a time series of images of a scene across a set time period.

4. The method of claim 3, further comprising:
   determining a current time,
   wherein the repeatability score of the identified interest point is further based on the determined current time.

5. The method of claim 4, wherein the current time is determined based on at least one of a received time from the client device, or the identified location of the client device and an internal time of a server.

6. The method of claim 3, wherein the repeatability model is trained by:
   receiving the time series of images of the scene across the set time period;
   identifying, using an interest point detection model, a set of training interest points in the received time series of images;
   for each training interest point in the set of training interest points, determining a repeatability function by identifying images in the time series of images in which the training interest point is detected by the interest point detection model; and
   training the repeatability model using information associated with one or more training interest points from the set of training interest points and corresponding repeatability functions of the one or more training interest points.

7. The method of claim 1, wherein the repeatability score is indicative of a likelihood that a trained interest point detection model will detect the interest point based on images captured by the client device.

8. A non-transitory computer readable storage medium configured to store instructions, the instructions that, when executed by a processor, cause the processor to:
   receive an image of a scene;
   identify a set of interest points from the received image of the scene;
   determine a repeatability score of each interest point in the set of interest points;
   select a subset of interest points based on the determined repeatability of each of the identified interest points;
   search, in a map, one or more interest points from the selected subset of interest points;
   receive information about one or more interest points from the selected subset of interest points; and
   determine a pose of a camera that captured the image of the scene based on the received information about the one or more interest point.

9. The non-transitory computer readable storage medium of claim 8, wherein the set of interest points are identified based on a trained interest point detection model.

10. The non-transitory computer readable storage medium of claim 8, wherein the repeatability score for an identified interest point is determined by applying a repeatability model based on the identified interest point.

11. The non-transitory computer readable storage medium of claim 10, wherein the repeatability model is trained based on a time series of images of a scene across a set time period.

12. The non-transitory computer readable storage medium of claim 10, wherein searching, in a map, one or more interest points from the selected subset of interest points comprises searching the one or more interest points in a three-dimensional (3D) map.

13. The non-transitory computer readable storage medium of claim 8, wherein determining a pose of a camera that captured the image of the scene comprises:
   determining a relative pose of the camera based on the received information about the one or more interest points; and
   determining an absolute pose of the camera based on a set of reference images and the determined relative pose of the camera.

14. The non-transitory computer readable storage medium of claim 8, wherein the scene corresponds to a real-world location that maps to a virtual location in a virtual world.

15. A computer-implemented method comprising:
   receiving a time series of images of a scene across a set time period;
   identifying, using an interest point detection model, a set of interest points in the received time series of images;
   for each interest point in the set of interest points, determining a repeatability function by identifying images in the time series of images in which the interest point is detected by the interest point detection model; and
   training a repeatability model using information associated with one or more interest points from the set of interest points and corresponding repeatability functions of the one or more interest points.

16. The method of claim 15, wherein each image in the times series of images is associated with a timestamp, and wherein the repeatability function is further based on the timestamp associated with each image in which the interest point is detected by the interest point detection model.

17. The method of claim 15, wherein the repeatability function indicates, for each time period of a set of time period, whether the interest point was detected, by the interest point detection model, in an image corresponding to the time period.

18. The method of claim 15, wherein the repeatability function indicates, for each time period of a set of time period, a percentage of images corresponding to the time period in which the interest point was detected by the interest point detection model.

19. The method of claim 15, wherein the repeatability model is trained to predict a likelihood that a target interest point will be detected by the interest point detection model from an image captured within a given time interval.

20. The method of claim 15, wherein the repeatability model is trained to predict a time series of likelihoods that a target interest point will be detected by the interest point detection model from an image of the scene where the interest point is located.

\* \* \* \* \*